United States Patent [19]
Vaughn

[11] Patent Number: 5,772,115
[45] Date of Patent: Jun. 30, 1998

[54] LAWN AND GARDEN FERTILIZER DISTRIBUTING SYSTEM

[76] Inventor: Mitchal L. Vaughn, 27722 Sutters Pointe Dr., Santa Clarita, Calif. 91350

[21] Appl. No.: 729,998

[22] Filed: Oct. 11, 1996

[51] Int. Cl.⁶ ................................................. B01D 11/02
[52] U.S. Cl. .......................................... 239/69; 239/310
[58] Field of Search ............................ 239/10, 310, 318, 239/69, 78, 433

[56] References Cited

U.S. PATENT DOCUMENTS

| | | | |
|---|---|---|---|
| 2,785,012 | 3/1957 | Frewin | 239/318 X |
| 3,023,849 | 3/1962 | Tine | 239/318 X |
| 3,447,753 | 6/1969 | Proctor et al. | 239/318 X |
| 3,797,708 | 3/1974 | Sypal | 239/310 X |
| 4,385,034 | 5/1983 | Gacer | 239/310 X |
| 5,199,645 | 4/1993 | Anderson et al. | 239/310 |

FOREIGN PATENT DOCUMENTS 400929   9/1960   Switzerland ........................... 239/310

*Primary Examiner*—Kevin Weldon

[57] ABSTRACT

A lawn and garden fertilizer distributing system including a tank having an aperture through a lower end thereof. A tank lid is adapted for removable coupling with the tank. The tank lid has a recessed aperture therethrough. The tank lid has a hose inlet port and a hose outlet port. The recessed aperture has a lid removably coupled thereto. The inlet port has a hose extending outwardly therefrom. The hose couples with an existing main water line. The outlet port has a hose connector extending outwardly therefrom. A screen basket is positioned within the tank through the recessed aperture of the tank lid.

5 Claims, 3 Drawing Sheets

LAWN AND GARDEN FERTILIZER DISTRIBUTING SYSTEM

BACKGROUND OF THE INVENTION

1. Field of the Invention

The present invention relates to a lawn and garden fertilizer distributing system and more particularly pertains to dissolving, diluting and distributing chemical additives for feeding lawns, gardens and flower beds with a lawn and garden fertilizer distributing system.

2. Description of the Prior Art

The use of sprinkler systems is known in the prior art. More specifically, sprinkler systems heretofore devised and utilized for the purpose of distributing water and lawn care chemicals are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,303,729 to DeMarco discloses a lawn care chemical delivery device.

U.S. Pat. No. 5,199,645 to Anderson et al. discloses a sprinkler system conversion kit.

U.S. Pat. No. Des. 327,728 to Baker discloses the ornamental design for a lawn sprinkler for spraying water, chemicals, or the like.

U.S. Pat. No. 4,995,418 to Cervola discloses a fertilizer sprinkler apparatus.

U.S. Pat. No. 5,366,159 to Childers discloses an automatic lawn and garden feeding apparatus.

U.S. Pat. No. 4,993,634 to Hach et al. discloses a programmable chemical application system.

While these devices fulfill their respective, particular objective and requirements, the aforementioned patents do not describe a lawn and garden fertilizer distributing system for dissolving, diluting and distributing chemical additives for feeding lawns, gardens and flower beds.

In this respect, the lawn and garden fertilizer distributing system according to the present invention substantially departs from the conventional concepts and designs of the prior art, and in doing so provides an apparatus primarily developed for the purpose of dissolving, diluting and distributing chemical additives for feeding lawns, gardens and flower beds.

Therefore, it can be appreciated that there exists a continuing need for new and improved lawn and garden fertilizer distributing system which can be used for dissolving, diluting and distributing chemical additives for feeding lawns, gardens and flower beds. In this regard, the present invention substantially fulfills this need.

SUMMARY OF THE INVENTION

In the view of the foregoing disadvantages inherent in the known types of sprinkler systems now present in the prior art, the present invention provides an improved lawn and garden fertilizer distributing system. As such, the general purpose of the present invention, which will be described subsequently in greater detail, is to provide a new and improved lawn and garden fertilizer distributing system and method which has all the advantages of the prior art and none of the disadvantages.

To attain this, the present invention essentially comprises a tank having a generally cylindrical configuration. The tank has an externally threaded open upper end, an arcuate closed lower end and a cylindrical side wall therebetween. The arcuate closed lower end has an aperture therethrough. A tank lid is adapted for removable coupling with the externally threaded open upper end of the tank. The tank lid has a recessed aperture therethrough. The tank lid has a hose inlet port and a hose outlet port. The inlet port has an angularly disposed fill hole extending through the tank lid so as to be in fluid communication with the tank. The outlet port has an angularly disposed siphon hole extending through the tank lid so as to be in fluid communication with the tank. The recessed aperture has a lid removably coupled thereto. The inlet port has a hose extending outwardly therefrom. The hose couples with an existing main water line. The outlet port has a hose connector extending outwardly therefrom. The system includes a cylindrical screen basket having an open upper end, a closed lower end and a cylindrical side wall therebetween. The open upper end has a peripheral flange extending outwardly therefrom. The basket is positioned within the tank through the recessed aperture of the tank lid with the peripheral flange engaging the recessed aperture. An on/off valve is coupled to the hose disposed between the inlet port of the tank lid and the main water line. A drainage valve is coupled with the aperture in the arcuate closed lower end of the tank.

There has been thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved lawn and garden fertilizer distributing system which has all the advantages of the prior art sprinkler systems and none of the disadvantages.

It is another object of the present invention to provide a new and improved lawn and garden fertilizer distributing system which may be easily and efficiently manufactured and marketed.

It is a further object of the present invention to provide a new and improved lawn and garden fertilizer distributing system which is of durable and reliable construction.

An even further object of the present invention is to provide a new and improved lawn and garden fertilizer distributing system which is susceptible of a low cost of manufacture with regard to both materials and labor, and which accordingly is then susceptible of low prices of sale to the consuming public, thereby making such a lawn and garden fertilizer distributing system economically available to the buying public.

Even still another object of the present invention is to provide a new and improved lawn and garden fertilizer distributing system for dissolving, diluting and distributing chemical additives for feeding lawns, gardens and flower beds.

Lastly, it is an object of the present invention to provide a new and improved lawn and garden fertilizer distributing system including a tank having an aperture through a lower end thereof. A tank lid is adapted for removable coupling with the tank. The tank lid has a recessed aperture therethrough. The tank lid has a hose inlet port and a hose outlet port. The recessed aperture has a lid removably coupled thereto. The inlet port has a hose extending outwardly therefrom. The hose couples with an existing main water line. The outlet port has a hose connector extending outwardly therefrom. A screen basket is positioned within the tank through the recessed aperture of the tank lid.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
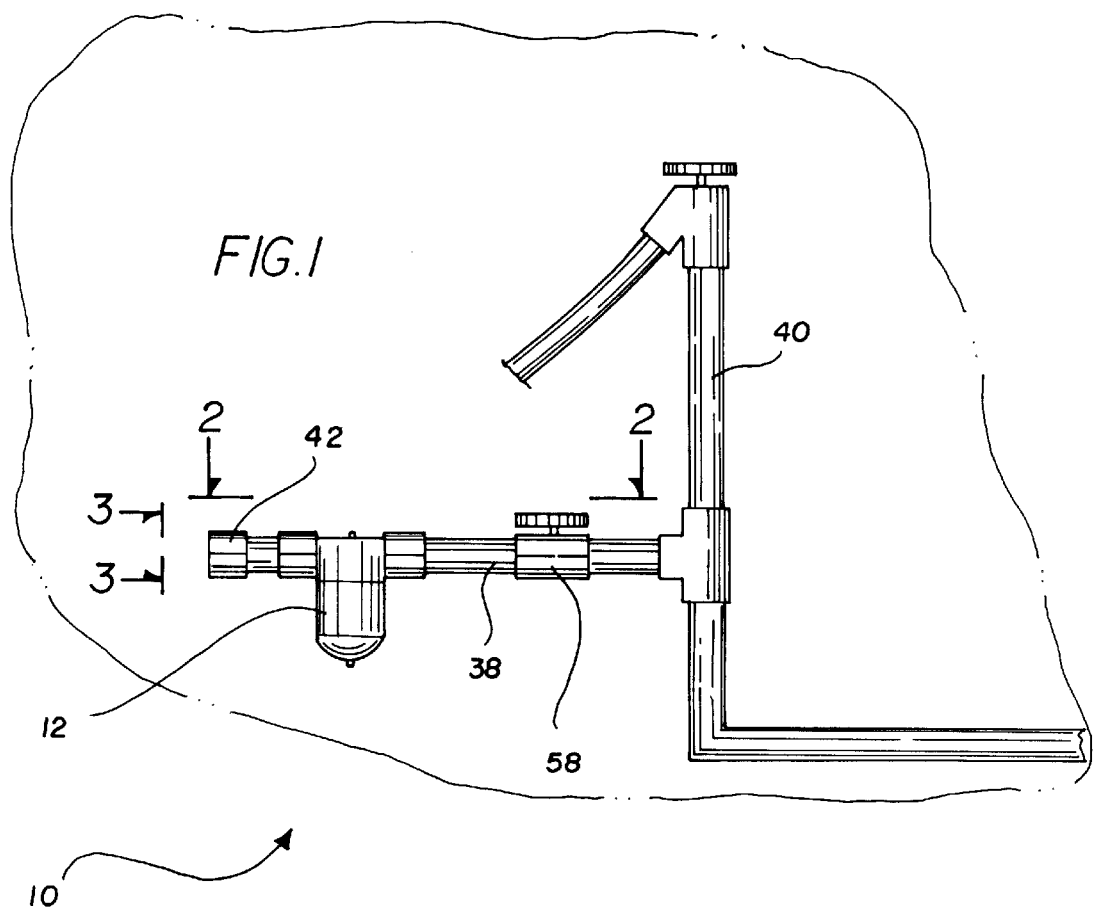
FIG. 1 is a front view of the preferred embodiment of the lawn and garden fertilizer distributing system constructed in accordance with the principles of the present invention.
Figure 2:
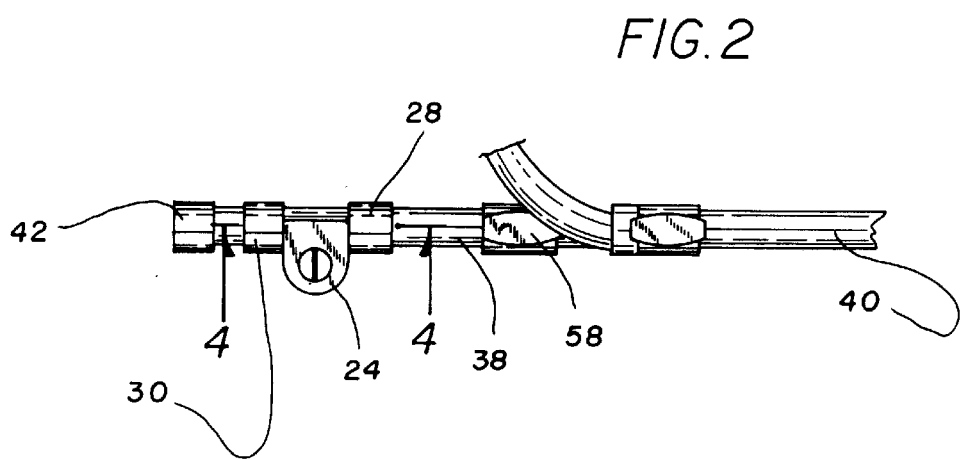
FIG. 2 is a plan view of the preferred embodiment of the present invention.
Figure 3:
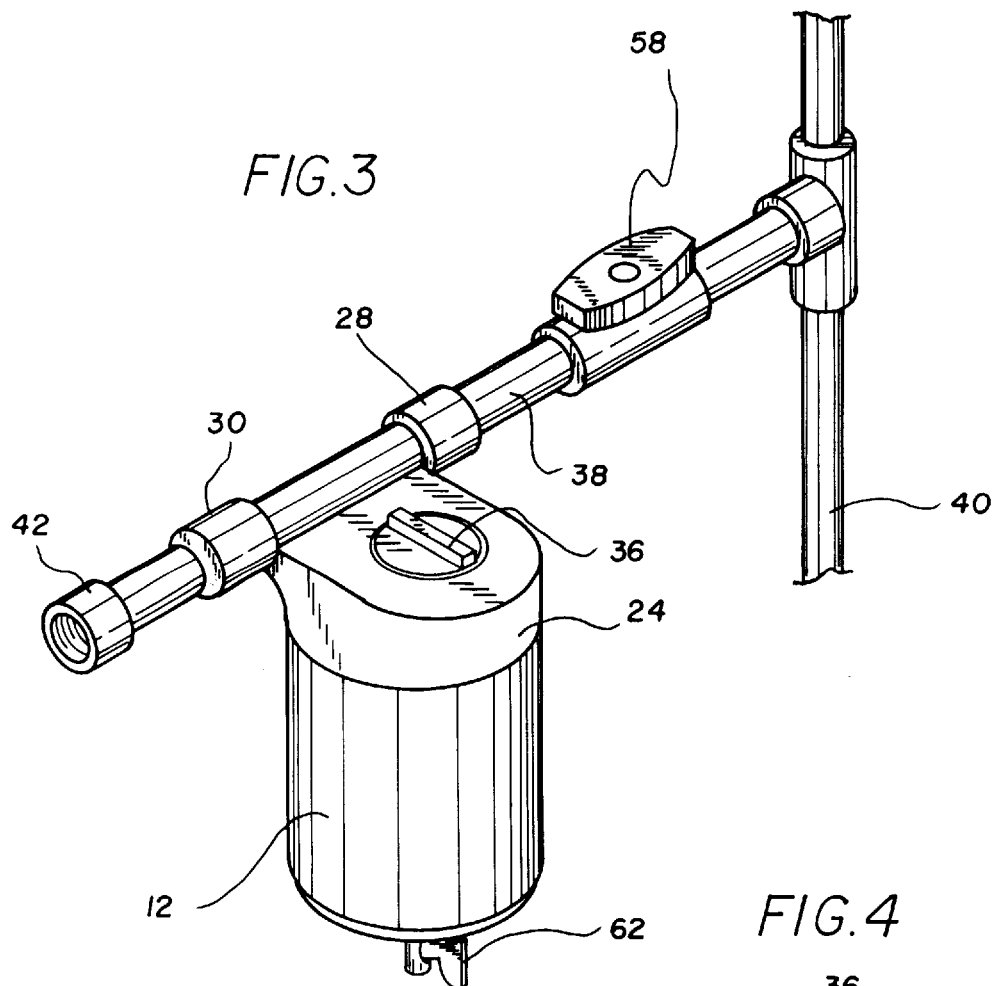
FIG. 3 is a perspective view of the preferred embodiment of the present invention.
Figure 4:
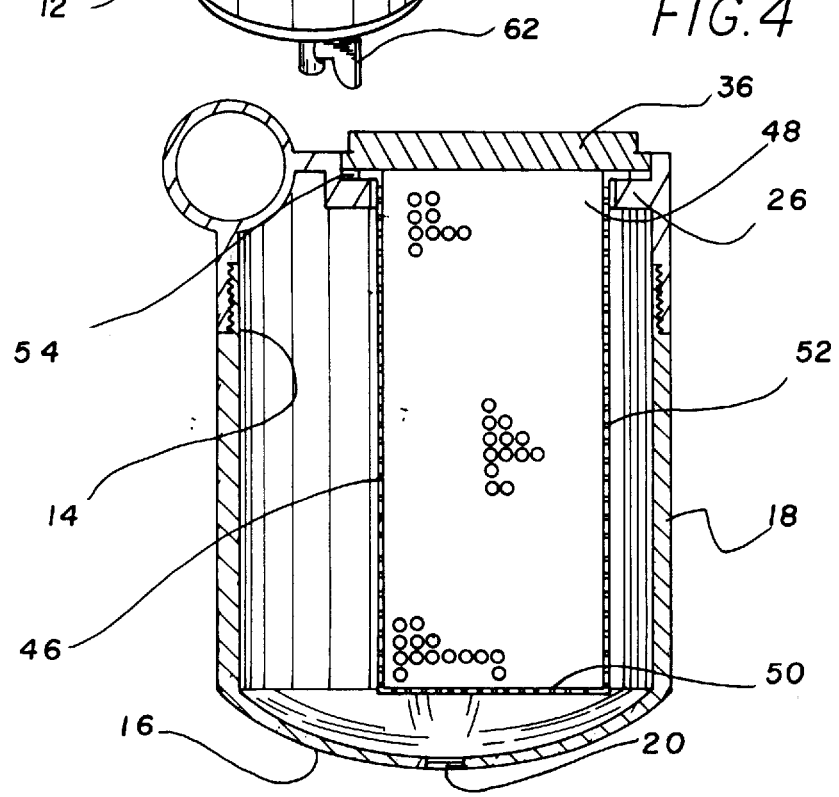
FIG. 4 is a cross-sectional view as taken along line 4—4 of FIG. 2.
Figure 5:
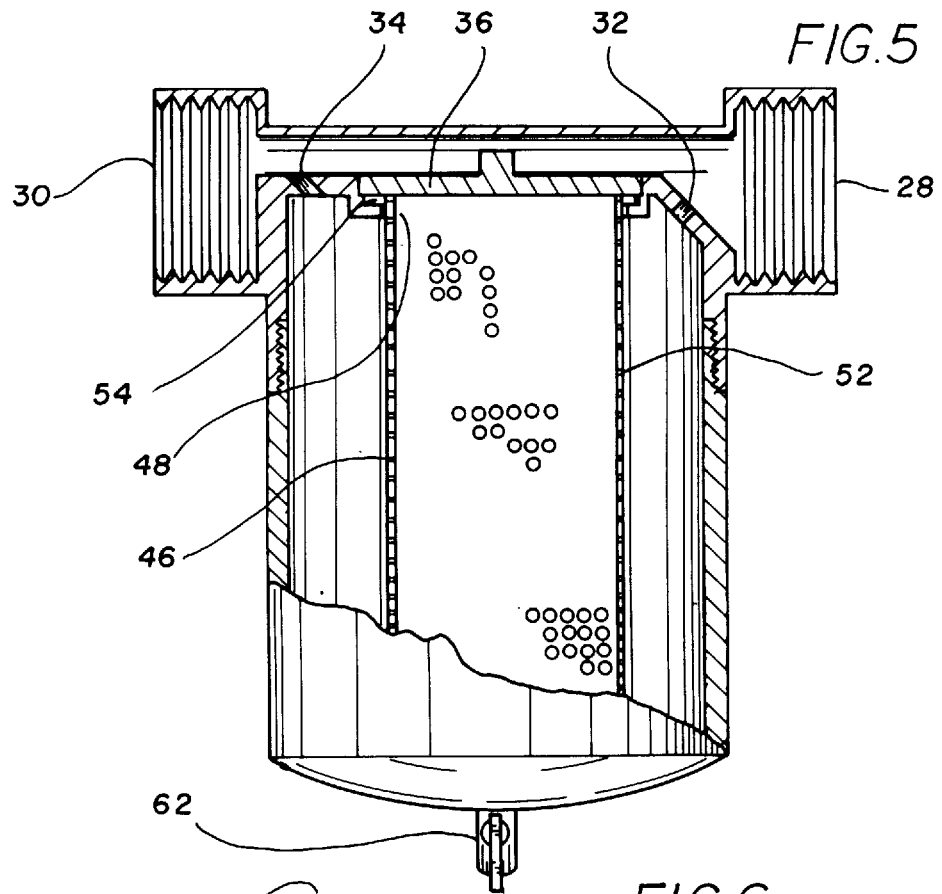
FIG. 5 is a cross-sectional front view of the tank of the present invention.

With reference now to the drawings, and in particular, to FIGS. 1–6 thereof, the preferred embodiment of the new and improved lawn and garden fertilizer distributing system embodying the principles and concepts of the present invention and generally designated by the reference number 10 will be described.

Specifically, it will be noted in the various Figures that the device relates to a lawn and garden fertilizer distributing system for dissolving, diluting and distributing chemical additives for feeding lawns, gardens and flower beds. In its broadest context, the device consists of a tank, a tank lid, a cylindrical screen basket, an on/off valve and a drainage valve. Such components are individually configured and correlated with respect to each other so as to attain the desired objective.

The system 10 includes a tank 12 having a generally cylindrical configuration. The tank 12 has an externally threaded open upper end 14, an arcuate closed lower end 16 and a cylindrical side wall 18 therebetween. The arcuate closed lower end 16 has an aperture 20 therethrough. The tank 12 is preferably constructed having a height greater than it's diameter.

A tank lid 24 is adapted for removable coupling with the externally threaded open upper end 14 of the tank 12. The tank lid 24 has a recessed aperture 26 therethrough. The tank lid 24 has a hose inlet port 28 and a hose outlet port 30. Both the inlet port 28 and the outlet port 30 are internally threaded to facilitate coupling with an externally threaded hose or conduit. The inlet port 28 and the outlet port 30 are in fluid communication with one another. The inlet port 28 has an angularly disposed fill hole 32 extending through the tank lid 24 so as to be in fluid communication with the tank 12. The outlet port 30 has an angularly disposed siphon hole 34 extending through the tank lid 24 so as to be in fluid communication with the tank 12. The recessed aperture 26 has a lid 36 removably coupled thereto. The inlet port 28 has a hose 38 extending outwardly therefrom. The hose 38 couples with an existing main water line 40. The outlet port 30 has a hose connector 42 extending outwardly therefrom. The hose connector 42 allows for the attachment of a garden hose for the distribution of fertilized water from the tank 12.

The system 10 includes a cylindrical screen basket 46 having an open upper end 48, a closed lower end 50 and a cylindrical side wall 52 therebetween. The open upper end 48 has a peripheral flange 54 extending outwardly therefrom. The basket 46 is positioned within the tank 12 through the recessed aperture 26 of the tank lid 24 with the peripheral flange 54 engaging the recessed aperture 26. The basket 46 is used to hold granular chemical additives added to the system 10. The granular chemical additives will then be broken down by the addition of water into the tank via the fill hole 32. The basket 46 will hold the granular chemical additives so that they will not cause the siphon hole 34 to become clogged.

An on/off valve 58 is coupled to the hose 38 disposed between the inlet port 28 of the tank lid 24 and the main water line 40. The on/off valve 58 is used to control the flow of water from the main water line 40 to the tank 12.

A drainage valve 62 is coupled with the aperture 20 in the arcuate closed lower end 16 of the tank 12. The drainage valve 62 is used to remove any diluted chemical additives or fertilizer therein.

Figure 6:
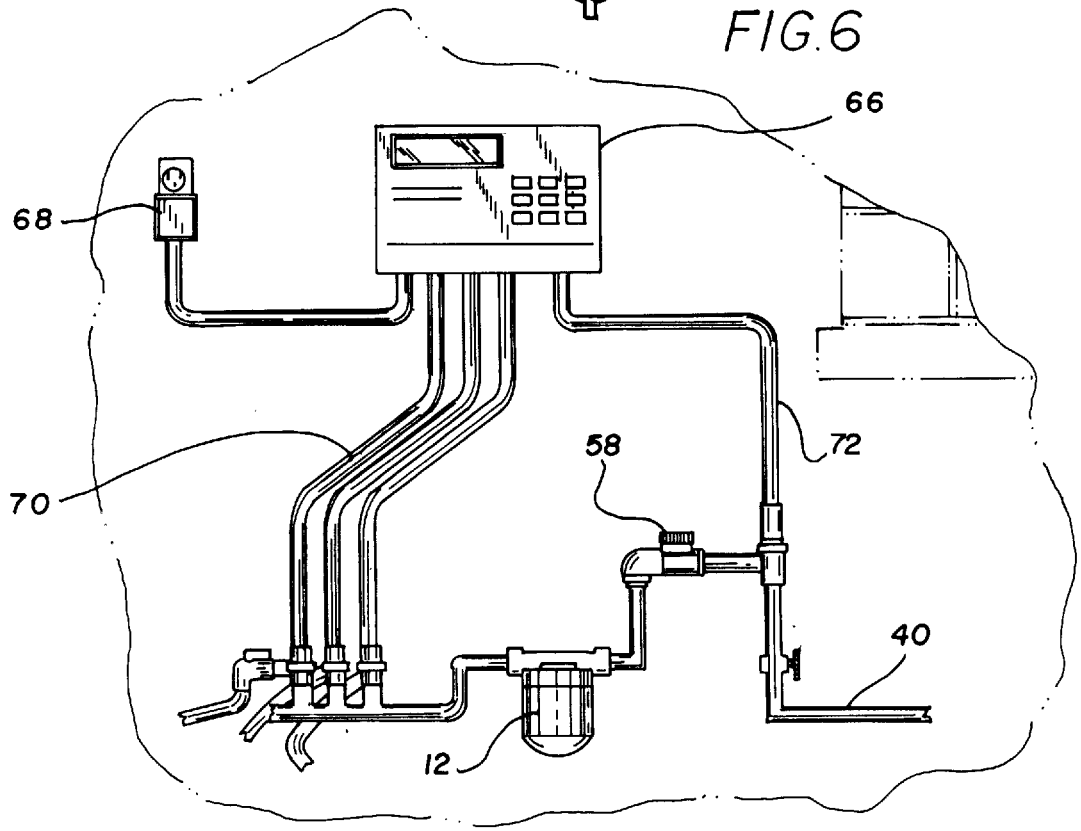
FIG. 6 is a front view of a second embodiment of the present invention.

A second embodiment of the present invention is shown in FIG. 6 and includes substantially all of the components of the present invention further including the inclusion of a programmable electronic controller 66 coupled with the system 10. The controller 66 includes a plug-in transformer 68 for coupling with an electrical outlet. The controller 66 will have electrical lines 70 extending therefrom for connection with a sprinkler system and a line 72 coupled with the main water line 40. Thus, activation of the system will cause water to flow from the main water line 40 through the tank 12. The diluted chemicals will then be distributed through the sprinkler system.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by LETTERS PATENT of the United States is as follows:

1. A lawn and garden fertilizer distributing system for dissolving, diluting and distributing chemical additives for feeding lawns, gardens and flower beds comprising, in combination:

a tank having a generally cylindrical configuration, the tank having an externally threaded open upper end, an arcuate lower end and a cylindrical side wall therebetween, the arcuate lower end having an aperture therethrough;

a tank lid adapted for removable coupling with the externally threaded open upper end of the tank, the tank lid having a recessed aperture therethrough, the tank lid having a hose inlet port and a hose outlet port, the inlet port having an angularly disposed fill hole extending through the tank lid so as to be in fluid communication with the tank, the outlet port having an angularly disposed siphon hole extending through the tank lid so as to be in fluid communication with the tank, the recessed aperture having a lid removably coupled thereto, the inlet port having a hose extending outwardly therefrom, the hose coupling with an existing main water line, the outlet port having a hose connector extending outwardly therefrom;

a cylindrical screen basket having an open upper end, a closed lower end and a cylindrical side wall therebetween, the open upper end having a peripheral flange extending outwardly therefrom, the basket positioned within the tank through the recessed aperture of the tank lid with the peripheral flange engaging the recessed aperture;

an on/off valve coupled to the hose disposed between the inlet port of the tank lid and the main water line; and a drainage valve coupled with the aperture in the arcuate lower end of the tank.

2. A lawn and garden fertilizer distributing system comprising:

a tank having an aperture through a lower end thereof;

a tank lid adapted for removable coupling with the tank, the tank lid having a recessed aperture therethrough, the tank lid having a hose inlet port and a hose outlet port, the recessed aperture having a lid removably coupled thereto, the inlet port having a hose extending outwardly therefrom, the hose coupling with an existing main water line, the outlet port having a hose connector extending outwardly therefrom;

a screen basket positioned within the tank through the recessed aperture of the tank lid;

wherein the inlet port having an angularly disposed fill hole extending through the tank lid so as to be in fluid communication with the tank.

3. The system as set forth in claim 2 wherein the outlet port having an angularly disposed siphon hole extending through the tank lid so as to be in fluid communication with the tank.

4. The system as set forth in claim 3 and further including a programmable electronic controller coupled with the outlet port.

5. The system as set forth in claim 4 and further including a sprinkler system coupled to the outlet port and the programmable electronic controller.

\* \* \* \* \*